US006539216B1

(12) United States Patent
Oh et al.

(10) Patent No.: US 6,539,216 B1
(45) Date of Patent: Mar. 25, 2003

(54) MICROWAVE FREQUENCY CONVERTING RECEIVER

(75) Inventors: Eung Gie Oh, Taejon (KR); Min Gun Kim, Taejon (KR); Sung Weon Kang, Taejon (KR); Jae Jin Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/475,053

(22) Filed: Dec. 30, 1999

(30) Foreign Application Priority Data

Nov. 1, 1999 (KR) .............................. 99-47886

(51) Int. Cl.[7] ................................. H04B 1/26
(52) U.S. Cl. ..................... 455/326; 455/315; 455/318; 455/553
(58) Field of Search ................. 455/326, 313, 455/315, 318, 323, 126, 188.1, 189.1, 190.1, 552, 553, 353

(56) References Cited

U.S. PATENT DOCUMENTS

| | | | | |
|---|---|---|---|---|
| 5,170,500 A | * | 12/1992 | Broderick | 455/315 |
| 5,528,769 A | | 6/1996 | Berenz et al. | 455/333 |
| 5,649,312 A | | 7/1997 | Kennan | 455/333 |
| 5,745,856 A | * | 4/1998 | Dent | 455/552 |
| 5,940,750 A | * | 8/1999 | Wang | 455/318 |
| 5,966,646 A | * | 10/1999 | Lampe et al. | 455/189.1 |
| 5,995,814 A | * | 11/1999 | Yeh | 455/180.1 |
| 6,125,266 A | * | 9/2000 | Matero et al. | 455/126 |
| 6,134,427 A | * | 10/2000 | Hughes | 455/269 |

OTHER PUBLICATIONS

Leonard Reynolds, Downconverter IC Processes Signals from 500 to 1900 MHZ, Jul. 1997, p.134–118.
Douglas et al., A Downconverter for use in a Dual–Mode AMPS/CDMA Chip Set, Feb. 1996, p.20–42.

* cited by examiner

Primary Examiner—Edward F. Urban
Assistant Examiner—Erika A. Gary
(74) Attorney, Agent, or Firm—Jacobson Holman PLLC

(57) ABSTRACT

A microwave frequency converting receiver of an RF unit should be generally used in wireless/mobile communications systems such as cellular, PCS, WLL and IMT2000 systems and also have low power consumption, low-noise characteristic, high gain and small size. In order to produce the above frequency converting receiver, a multi-band and multi-mode frequency converting receiver for use in a wireless mobile communications system comprises a wideband low-noise amplifier for amplifying a radio frequency input signal, a frequency mixer for generating an intermediate frequency signal having a relatively high linearity by mixing a local oscillator frequency signal and the amplified radio frequency signal outputted from the wideband low noise amplifier, an intermediate frequency amplifier for producing a final intermediate frequency signal by amplifying the intermediate frequency signal derived from the frequency mixer and an input matching circuit for receiving a microwave signal within a frequency band of the wireless mobile communications system, impedance-matching the received microwave signal to the radio frequency input signal of the wideband low-noise amplifier and determining an operating frequency band of the frequency converting receiver.

11 Claims, 3 Drawing Sheets

MICROWAVE FREQUENCY CONVERTING RECEIVER

FIELD OF THE INVENTION

The present invention relates to a frequency converting receiver; and, more particularly, to a monolithic microwave integrated circuit(MMIC) frequency converting receiver which employs field effect transistors(FETs) and is used in wireless/mobile communication systems.

DESCRIPTION OF THE PRIOR ART

Recently, to accommodate the tremendously increasing wireless communications demand, the need of a large capacity communication method is increasing. As a result, there has been proposed a digital scheme capable of accommodating a lot of users compared to a conventional analog scheme and there are being developed mobile communications systems providing services in various frequency bands. As examples, there are a cellular at about 900 MHz and a personal communications services(PCS) at about 1.9 GHz which is presently providing communications services, and international mobile telecommunications 2000 (IMT2000) at about 2.1 GHz and a wireless local loop(WLL) at about 2.4 GHz which will be served sooner or later.

Further, portable terminals used in the above various communications services have been developed depending on the communications systems. And the down converter IC chips used in the potable terminals of various communications services have own specific purpose and operating frequency.

At this time, there is increasing the demand of a multi-band, multi-mode portable terminal capable of serving all kinds of communications services by using one portable terminal and, thereafter, it is necessary to develop a wideband microwave frequency converting receiver so as to develop the multi-band, multi-mode portable terminal.

In general, the microwave frequency converting receiver comprises a low-noise amplifier(LNA) for detecting and amplifying weak radio frequency signals(referred to as "RF signals" hereinafter), a frequency mixer for modulating or mixing small RF signals and large local oscillator signals (referred to as "LO signals" hereinafter) to thereby produce signals having sum, difference(intermediate frequency signal referred to as "IF signal" hereinafter) or multiple frequencies of the RF signals and the LO signals and a balun and IF signal amplifier for producing complementary signals based on a single signal.

The conventional frequency converting receiver shown above is produced according to a hybrid scheme manufacturing a whole receiver by assembling its components. Therefore, although the frequency converting receiver is made as an MMIC, it is only applicable to one system whose operating frequency is within a narrow frequency band and corresponds to that of the receiver. This type of conventional frequency converting receiver for the hand held phone application is disclosed in an article published by A. Brunel et al., entitled "A DOWNCONVERTER FOR USE IN A DUAL-MODE AMPS/CDMA CHIP SET", *Microwave journal*, pp20~42, February 1996. A down converter IC, which operates in frequency range of 500~1900 MHz, is disclosed in an article by L.Reynolds, "Downconverter IC processes Signals From 500 To 1900 MHz, *Microwaves & RF*, pp134~140, July, 1997", where this chip set is employed in PCS application. Another type of the conventional frequency converting receiver is demonstrated in an article by Mark William et al., entitled "GaAs RF ICs TARGET 2.4 GHz FREQUENCY BAND", *Microwaves & RF*, pp111~118, July, 1994, which may have potential of application in WLL system. Another type of down converters for satellite communication is disclosed in U.S. Pat. Nos. 5,528,769 and 5,649,312 issued on Jun. 18, 1996 and Jul. 15, 1997. Like above down converter ICs, most developed down converter had the specific operating frequency depending on the communication system. And there is no a down converter MMIC which can be applied to a multi band, multi mode portable terminal. Thereafter, it is difficult to apply the receiver to a receiving end of an RF unit of all of communications systems.

Consequently, there is required to develop a wideband microwave frequency converting receiver applicable to the RF unit which can be used in all of the wireless/mobile communications systems and the wideband microwave frequency converting receiver should have low-noise, high conversion gain and high linearity characteristics over a wide frequency band.

In addition, the portable terminal is continuously developed to have smaller size and lighter weight. Since a capacitor having a low capacity in order to reduce the weight of the portable terminal, it is necessary for the portable terminal to use components operating with low power consumption so as to extend its operating time. And, in order to manufacture the portable terminal having smaller size and lighter weight, it is also necessary to reduce the sizes of the components constituting the portable terminal. Further, as the number of subscribers of the mobile telephone system increases, a portable terminal having an advanced transmitting and receiving characteristic(specially, low-noise and high linearity characteristics) is required. Therefore, the performances of the components constituting the portable terminals should be also improved. In particular, microwave components which are core components of the portable terminal are being developed to the smallization through the use of an MMIC scheme, low-cost by a chip smallization scheme and low power by the improvement of a circuit structure.

Herein, the MMIC is referred to as a circuit employing active and passive devices integrated in a single semiconductor wafer. Compared with a conventional circuit employing individual devices therein, it is possible to reduce the size and weight of a circuit integrated in the MMIC since the pitches of devices constituting the circuit can be reduced. Further, since parasitic components due to the packaging of individual devices are originally eliminated, the availability of a frequency bandwidth can be substantially improved. Therefore, the trend is that the RF components of the wireless/mobile communications system are integrated into the MMIC in order to mass-produce a low cost, small size and light weight wireless/mobile communications equipment(e.g., mobile communications terminal) with low cost and good reproduction characteristics. The most important subject is to reduce the size of the MMIC since the manufacturing cost of the MMIC increases proportional to its size.

Therefore, it is required to develop a wideband frequency converting receiver which can be used in all of the wireless/mobile communication systems such as the cellular, PCS, WLL and IMT2000 and, further, integrated into the MMIC which results in mass-producing a low cost microwave frequency converting receiver applicable to the RF unit with low cost and good reproduction characteristics, which has low power consumption, low-noise, high gain and small size characteristics.

SUMMARY OF THE INVENTION

It is, therefore, a primary object of the present invention to provide a microwave frequency converting receiver applicable to an RF unit, which can be used in all of wireless/mobile communications systems such as cellular, PCS, WLL and IMT2000 systems and, further, has low power consumption, low-noise, high gain and small size characteristics.

In accordance with the present invention, there is provided a multi-band and multi-mode frequency converting receiver for use in a wireless mobile communications system, comprising: a wideband low-noise amplifier for amplifying a radio frequency input signal; a frequency mixer for producing an intermediate frequency signal having a relatively high linearity by mixing a local oscillator frequency signal and the amplified radio frequency signal outputted from the wideband low-noise amplifier; an intermediate frequency amplifier for producing a final intermediate frequency signal by amplifying the intermediate frequency signal derived from the frequency mixer; and an input matching circuit for receiving a microwave signal within a frequency band of the wireless mobile communications system, impedance-matching the received microwave signal to the radio frequency input signal of the wideband low-noise amplifier and determining an operating frequency band of the frequency converting receiver.

BRIEF DESCRIPTION OF THE DRAWINGS

The foregoing and other objects, features and advantages of the present invention will become apparent from the following detailed description of preferred embodiments of the invention with reference to the accompanying drawings, in which.

DETAILED DESCRIPTION OF THE PREFERRED EMBODIMENTS

Figure 1:
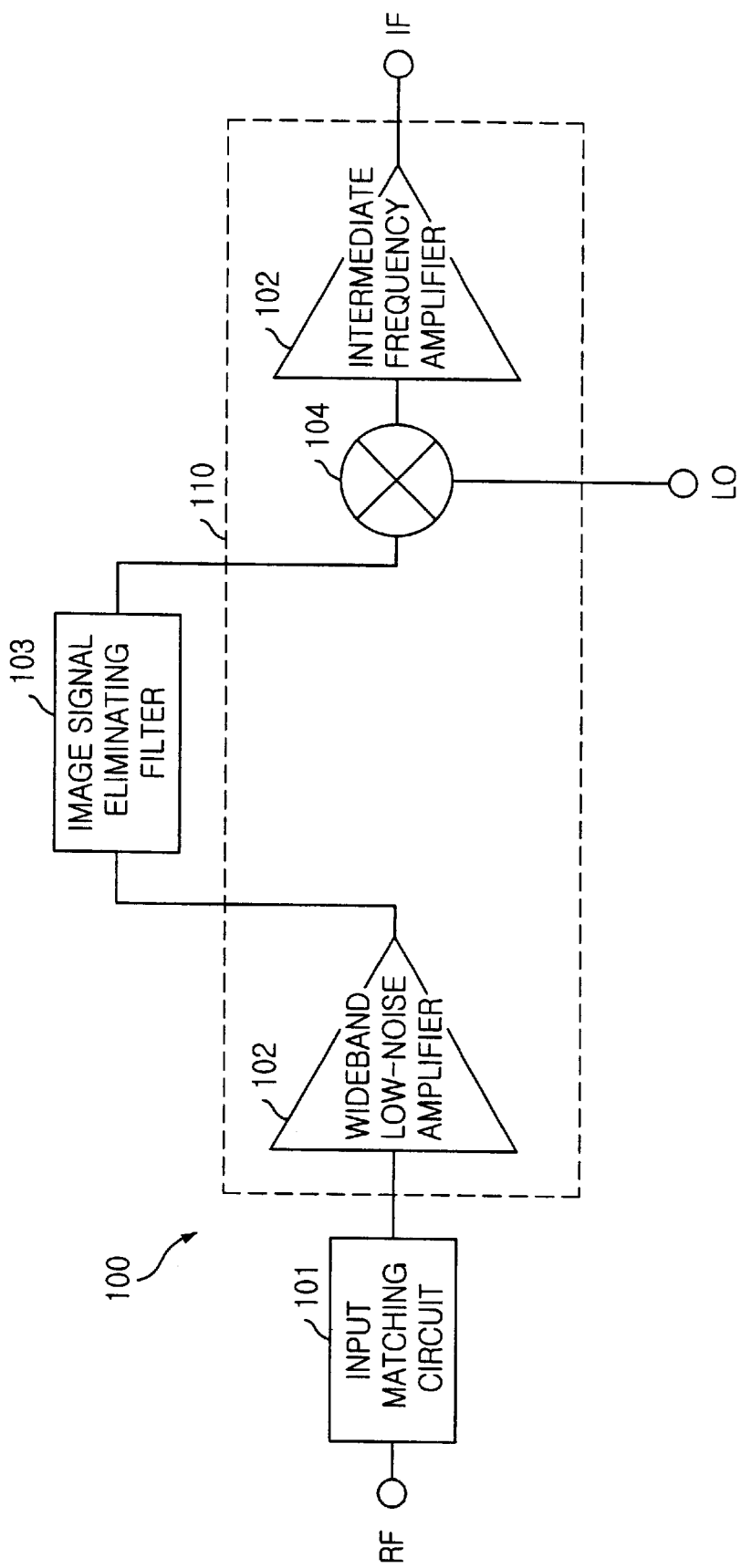
FIG. 1 represents a block diagram of a frequency converting receiver in accordance with the present invention.

Referring to FIG. 1, there is illustrated a block diagram of a frequency converting receiver in accordance with the present invention. In this diagram, reference numerals 100, 101, 102, 103, 104, 105 denote a frequency converting receiver, an input matching circuit, a wideband low-noise amplifier, an image signal eliminating filter, a frequency mixer and an intermediate frequency amplifier, respectively.

In FIG. 1, the frequency converting receiver 100 comprises the input matching circuit 101 receiving a radio frequency(RF) signal, the wideband low-noise amplifier 102 amplifying the RF signal coupled from the input matching circuit 101, an MMIC chip 110 including the frequency mixer 104 having a high linearity and the intermediate frequency amplifier 105, and the image signal eliminating filter 103 which is positioned outside of the MMIC chip 110. The image signal eliminating filter 103 eliminates an image signal from the output signal of the wideband low-noise amplifier 102 and provides it to the frequency mixer 104.

More specifically, the RF signal is inputted to the wideband low-noise amplifier 102 via the input matching circuit 101 and then amplified. The amplified signal from which the image signal eliminating filter 105 eliminates the image signal is inputted into the frequency mixer 104 together with an LO signal and mixed to thereby produce an IF signal whose frequency is the difference between the RF and LO frequencies. The IF signal is re-amplified at the intermediate frequency amplifier 105 and outputted as a final IF signal.

Figure 2:
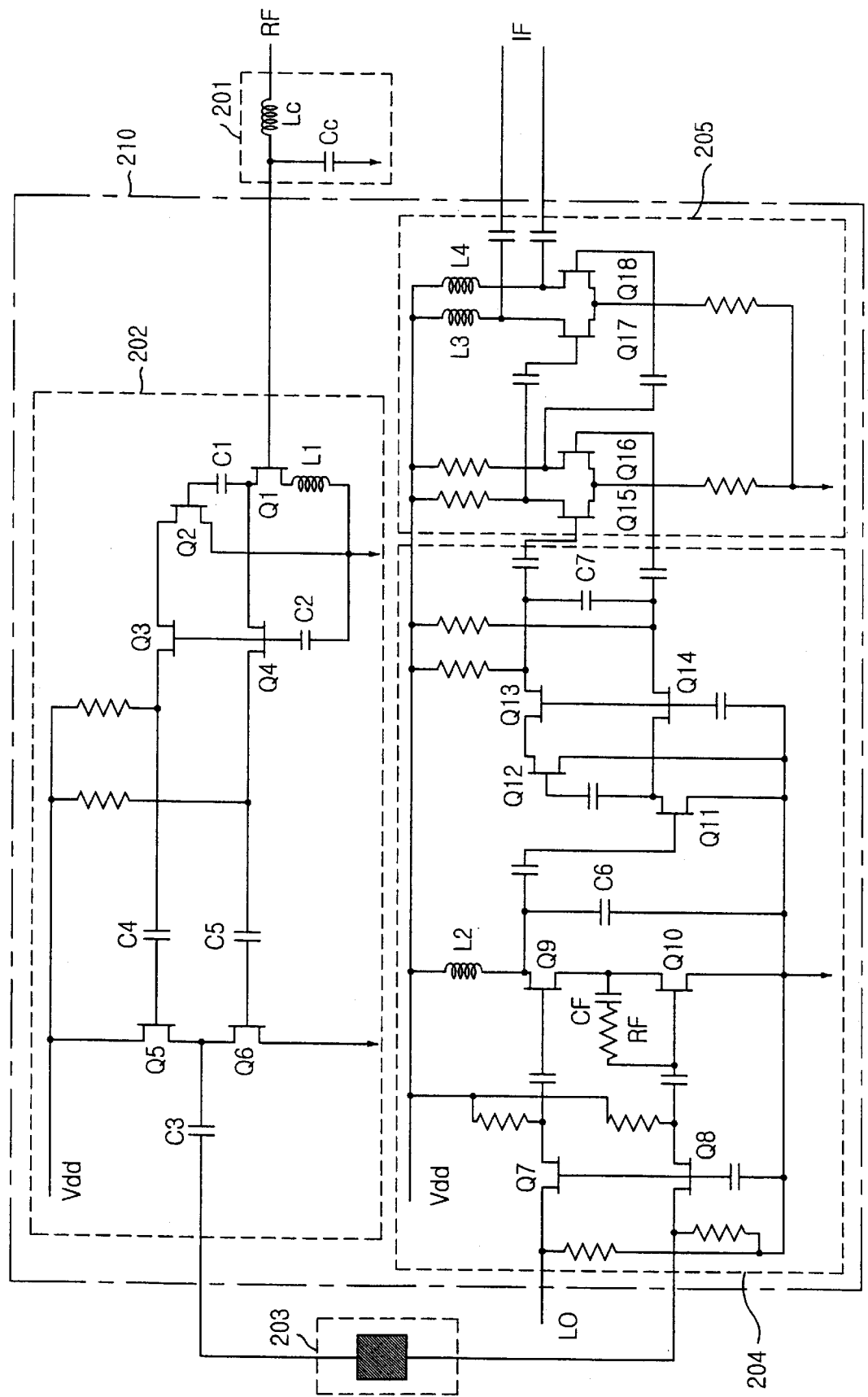
FIG. 2 shows an internal circuit diagram of the frequency converting receiver in accordance with an embodiment of the present invention.

Referring to FIG. 2, there is shown an internal circuit diagram of the frequency converting receiver in accordance with an embodiment of the present invention and, herein, a gate bias circuit is omitted for the simplicity of configuration. In this drawing, the frequency mixer is illustrated to incorporate therein a balun in order to clarify the connection between the frequency mixer and the balun.

Hereinafter, the internal circuit configuration of the components constituting the frequency converting receiver will be explained in detail.

First of all, an input matching circuit 201 positioned outside of an MMIC chip 210 is made of a chip inductor Lc and a chip capacitor Cc so as to perform the impedance matching at an input terminal of a wideband low-noise amplifier 202 in each frequency band, e.g., a cellular band, a PCS band and so on. As a result, an operating frequency band of the frequency converting receiver is determined depending on the input matching circuit 201.

The wideband low-noise amplifier 202 is constituted to have a low-noise characteristic in the frequency band determined by the input matching circuit 201 and have a low output standing-wave ratio and a high linearity in a wide frequency band. Specifically, the wideband low-noise amplifier 202 comprises an inductor L1 whose one side is connected to a ground voltage terminal, a source-coupled input transistor Q1 whose gate receives a small-sized RF input signal from the input matching circuit 201 and source is connected to the other side of the inductor L1, a capacitor C1 whose one side is connected to the drain of the input transistor Q1, a transistor Q2 whose gate is connected to the other side of the capacitor C1 and source is coupled to the ground voltage terminal and which outputs an RF signal whose phase is opposite to that of the RF signal amplified by the input transistor Q1, a capacitor C3 whose one side is connected to an output terminal, actively matched output transistors Q5 and Q6 which are of a push-pull structure and commonly connected to the other side of the capacitor C3, a capacitor C2 whose one side is coupled to the ground voltage terminal, gate-coupled amplification transistors Q3 and Q4 whose sources are connected to the drain of the transistor Q2 and the drain of the input transistor Q1, respectively, and gates are commonly coupled to the other side of the capacitor C2 to thereby provide complementary signals to the output transistors Q5 and Q6, and capacitors C4 and C5 connected between the drains of the amplification transistors Q3 and Q4 and the gates of the output transistors Q5 and Q6, respectively.

Characteristically, the wideband low-noise amplifier 202 includes the gate-coupled amplification transistors Q3 and Q4 so as to provide complementary signals to the push-pull structural output transistors Q5 and Q6 employed between the input terminal and the output terminal. As a result, the amplifier 202 can have low-noise and linearity characteristics in a wide frequency band. In general, a source-coupled amplifier is known to have a low-noise characteristic. A gate-coupled amplifier is used as a wideband amplifier. The push-pull structural amplifier is usually used at an output matching terminal of an amplifier requiring high linearity since it can generate a higher output power than that of a drain-coupled amplifier.

As shown above, the RF signal fed to the gate of the input transistor Q1 is amplified and coupled to the gate of the transistor Q2 which outputs through its drain a signal whose phase is opposite to the RF signal. Herein, the signal outputted from the drain of the transistor Q2 and the RF signal outputted from the drain of the input transistor Q1 which are complementary are provided to the sources of the amplification transistors Q3 and Q4, respectively, and amplified to thereby being inputted to the gates of the transistors Q5 and Q6, respectively.

The output of the wideband low-noise amplifier 202 is provided through a common node of the source of the output transistor Q5 and the drain of the output transistor Q6. The output RF signal of the wideband low-noise amplifier 202 is coupled to an image eliminating band filter 203 which eliminates an image signal from the output RF signal to thereby provide it to an RF input terminal of a frequency mixer 204.

Meanwhile, the frequency mixer 204 comprises an internal input matching unit receiving the RF signal from the image eliminating band filter 203, a cascaded mixer core unit and a balun unit having low-noise and high amplification characteristics. Herein, the internal input matching unit includes a transistor Q8 receiving the RF signal from the image eliminating band filter 203 through its source and a transistor Q7 receiving the LO signal through its source, thereby constituting a gate-coupled active matching unit. The mixer core unit includes a transistor Q9 receiving the drain output of the transistor Q7 through its gate and a transistor Q10 receiving the drain output of the transistor Q8 through its gate, wherein the transistors Q9 and Q10 are connected in series between a source voltage terminal and the ground voltage terminal, an inductor L2 which is connected between the source voltage terminal and the source of the transistor Q9 and used as an output resistive component to provide a high output power without distortion, a capacitor CF and a resistor RF which are connected in series between the source of the transistor Q9 and the gate of the transistor Q10 to thereby form a feedback structure and a capacitor C6 which is connected between the drain of the transistor Q9 and the ground voltage terminal to thereby operate as a low pass filter. The balun unit comprises a transistor Q11 whose gate receives the output signal of the mixer core unit and source is connected to the ground voltage terminal, a transistor Q12 whose gate is joint to the drain of the transistor Q11 and source is connected to the ground voltage terminal and which outputs a signal having an opposite phase to the signal outputted from the drain of the transistor Q11, gate-coupled amplification transistors Q13 and Q14 whose gates are commonly connected to the ground voltage terminal, wherein the transistor Q13 is connected between the drain of the transistor Q12 and a first output terminal of the frequency mixer 204 and the transistor Q14 is joint between the drain of the transistor Q11 and a second output terminal of the frequency mixer 204, and a capacitor C7 which is connected between the drain of the transistor Q13 and the drain of the transistor Q14 and operates as a low pass filter.

The frequency mixer constituted as illustrated above has low-noise, low power consumption and high linearity characteristics since the mixer has the cascaded structure, low-noise and high conversion gain characteristics.

Specifically, the mixer core unit having the cascaded structure improves the linearity by using the inductor L2 as an output resistor so as to provide the high output power without distortion. Further, the mixer core unit enhances its stability and linearity by using the feedback from the source of the transistor Q9 to the gate of the transistor Q10 through the use of the resistor RF and the capacitor CF.

With reference to the drawings, the detailed operation of the frequency mixer 204 is described hereinafter.

The LO signal and the RF signal derived from the transistors Q7 and Q8, respectively, through the matching operation of the internal input matching unit are inputted to the gates of the transistors Q9 and Q10, respectively. The RF signal inputted to the gate of the transistor Q10 is amplified by the transistor Q10 and outputted through the drain of the transistor Q10 to be provided to the source of the transistor Q9. On the other hand, the LO signal fed to the gate of the transistor Q9 changes an operating point of the transistor Q10 connected to the source of the transistor Q9. In other words, if the LO signal having a positive period is coupled to the gate of the transistor Q9, the operating point of the transistor Q10 is moved to a saturation region having a large transconductance so that the transistor Q10 greatly amplifies the RF signal coupled to its gate. On the other hand, if the LO signal having a negative period is coupled to the gate of the transistor Q9, the operating point of the transistor Q10 is moved to a saturation region having a small transconductance so that the transistor Q10 amplifies the RF signal by a small amount. As described above, the RF signal and the LO signal are mixed. Thereafter, there can be generated, through the drain of the transistor Q9, the RF signal, the LO signal and all kinds of signals(including an IF signal) represented by the multiple of the RF signal and the LO signal. In case of a downward frequency mixer, since the frequencies of the LO signal and the RF signal and the frequency of the IF signal are substantially separated, high frequency components are removed by the capacitor C1 operating as a low pass filter and a relatively large signal whose frequency is close to the frequency of the IF signal is only provided to the gate of the transistor Q11.

Continuously, a portion of the RF signal outputted from the drain of the transistor Q11 is inputted to the gate of the transistor Q12 and a signal having an opposite phase to the inputted RF signal is outputted from the drain of the transistor Q12. The signal outputted from the drain of the transistor Q12 and the RF signal outputted from the drain of the transistor Q11 which are complementary are provided to the sources of the transistors Q13 and Q14, respectively, and amplified. The high frequency signals except the IF signal among the signals outputted from the drains of the transistors Q13 and Q14 are substantially reduced by the capacity C2 operating as a low pass filter and, thereafter, large-sized complementary IF signals are only detected at the first and second output terminals of the frequency mixer 204.

Finally, an intermediate frequency amplifier 205 is constituted by a two-stage differential amplifier. The first differential amplifier is made of a transistor Q15 whose gate is connected to the first output terminal of the frequency mixer 204, and a transistor Q16 whose gate is joint to the second output terminal of the frequency mixer 204. On the other hand, the second differential amplifier contains a transistor Q17 whose gate is connected to the drain of the transistor Q15, and a transistor Q18 whose gate is joint to the drain of the transistor Q16. Also, the intermediate frequency amplifier 205 further includes as loads inductors L3 and L4 connected between the source voltage terminal and the drains of the transistors Q17 and Q18, respectively, in order to increase the linearity by raising the output power capacity.

The complementary IF signals outputted from the first and the second output terminals of the frequency mixer 204 are amplified in the intermediate frequency amplifier 205 employing the two-stage differential amplifiers Q15, Q16, Q17 and Q18 and then outputted through an IF final output terminal of the MMIC 210.

Figure 3:
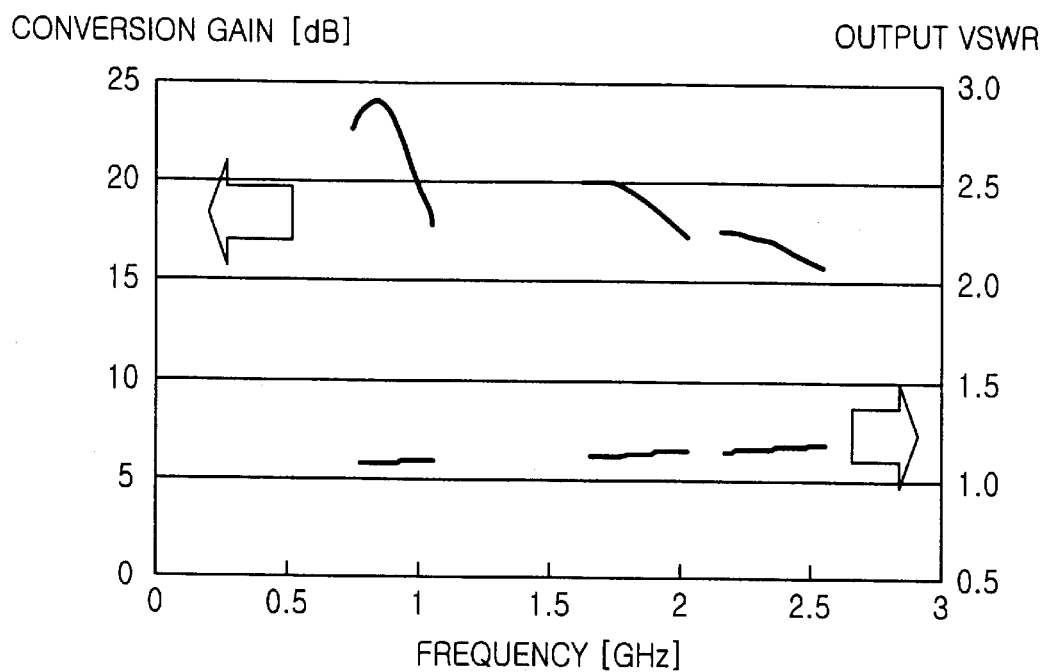
FIG. 3 provides a characteristic diagram of a conversion gain and output standing-wave ratio of the wideband low-noise amplifier in FIG. 2.

Referring to FIG. 3, there is shown a characteristic diagram of a conversion gain and an output standing-wave ratio of the wideband low-noise amplifier in FIG. 2. In this drawing, the conversion gain and the output standing-wave ratio of the wideband low-noise amplifier are represented by a frequency function. With reference to FIG. 3, it can be seen that three bands shown in FIG. 3 are frequency bands determined at the input matching circuit 201; the conversion gain is more than or equal to 15 dB at all of bands; and the output standing-wave ration is less than or equal to 1.3.

Figure 4:
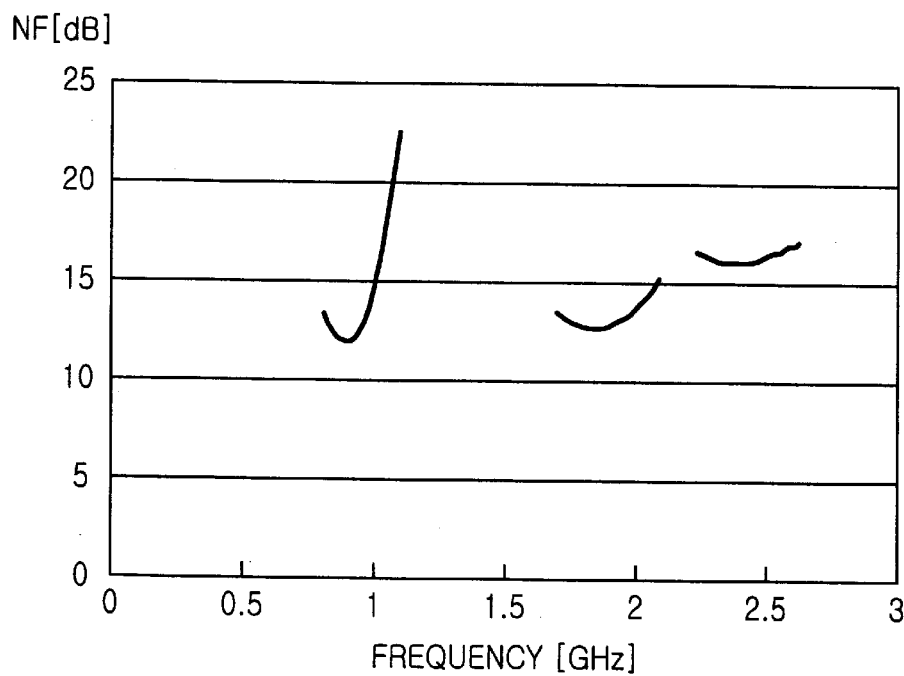
FIG. 4 illustrates a noise characteristic diagram of the wideband low-noise amplifier in FIG. 2.

Referring to FIG. 4, there is illustrated a noise characteristic diagram of the wideband low-noise amplifier in FIG. 2, which shows the noise characteristic depending on the frequency of the wideband low-noise amplifier. In this drawing, it can be understood that the noise is less than or equal to 1.5 dB at all of wireless/mobile service frequency bands.

Therefore, the frequency converting receiver of the present invention can be used in all of the wireless/mobile communications systems such as the cellular, PCS, WLL and IMT2000 and, further, implemented as a wideband frequency converting receiver for use in the MMIC which mass-produces a low cost microwave frequency converting receiver applicable to the RF unit with low cost and good reproduction characteristics, which has low power consumption, low-noise, high gain and small size characteristics.

While the present invention has been described with respect to the particular embodiments, it will be apparent to those skilled in the art that various changes and modifications may be made without departing from the spirit and scope of the invention as defined in the following claims.

What is claimed is:

1. A multi-band and multi-mode frequency converting receiver for use in a wireless mobile communications system, comprising:

a wideband low-noise amplifying means for amplifying a radio frequency input signal;

a frequency mixing means for producing an intermediate frequency signal having a relatively high linearity by mixing a local oscillator frequency signal and the amplified radio frequency signal outputted from the wideband low noise amplifying means;

an intermediate frequency amplifying means for producing a final intermediate frequency signal by amplifying the intermediate frequency signal derived from the frequency mixing means; and an input matching means for receiving a microwave signal within a frequency band of the wireless mobile communications system, impedance-matching the received microwave signal to the radio frequency input signal of the wideband low-noise amplifying means and determining an operating frequency band of the frequency converting receiver, wherein the wideband low-noise amplifying means includes:

a source-coupled input terminal circuit for amplifying the radio frequency input signal from the input matching means and outputting first and second radio frequency signals which are complementary;

a gate-coupled amplifying circuit for amplifying the first and the second radio frequency signals provided from the input terminal circuit; and a push-pull active matching output terminal circuit for driving the amplified radio frequency signals in response to the first and the second radio frequency signals provided from the gate-coupled amplifying circuit.

2. The multi-band and multi-mode frequency converting receiver as recited in claim 1, wherein the wideband low-noise amplifying means, the frequency mixing means and the intermediate frequency amplifying means are integrated as one chip to thereby provide a microwave monolithic integrated chip(MMIC).

3. The multi-band and multi-mode frequency converting receiver as recited in claim 2, wherein the input matching means includes an inductor and a capacitor connected in series between an input terminal and a ground voltage terminal and an input node of the wideband low-noise amplifying means is connected to a common node of the inductor and the capacitor.

4. The multi-band and multi-mode frequency converting receiver as recited in claim 1, wherein the source-coupled input terminal circuit contains:

an inductor whose one side is connected to the ground voltage terminal;

a first transistor whose gate receives the radio frequency input signal from the input matching means and source is connected to the other side of the inductor;

a first capacitor whose one side is connected to the drain of the first transistor; and a second transistor whose gate is connected to the other side of the first capacitor and source is connected to the ground voltage terminal, and which outputs a second radio frequency signal, having an opposite phase to the first radio frequency signal and amplified through the first transistor, via its drain.

5. The multi-band and multi-mode frequency converting receiver as recited in claim 4, wherein the gate-coupled amplifying circuit contains:

a first and a second resistors each of which has one side connected to a source voltage terminal;

a second capacitor whose one side is joint to the ground voltage terminal;

a third transistor which is located between the drain of the first transistor and the other side of the first resistor and whose gate is connected to the other side of the second capacitor; and a fourth transistor which is positioned between the drain of the second transistor and the other side of the second resistor and whose gate is connected to the other side of the second capacitor.

6. The multi-band and multi-mode frequency converting receiver as recited in claim 5, wherein the push-pull active matching output terminal circuit contains:

a third and a fourth capacitors whose one sides are connected to the other sides of the first and the second resistors, respectively;

a fifth and a sixth transistors which are connected in series between the source voltage terminal and the ground voltage terminal, wherein the gate of the fifth transistor is joint to the other side of the fourth capacitor and that of the sixth transistor is connected to the other side of the third capacitor; and a fifth capacitor connected between a common node of the fifth and the sixth transistors and the output terminal of the wideband low-noise amplifying means.

7. The multi-band and multi-mode frequency converting receiver as recited in claim 1, wherein the frequency mixing means includes:

an internal input matching circuit for impedance-matching a radio frequency signal, having no image signal, provided from an image eliminating filter means and the local oscillator frequency signal coupled thereto;

a cascaded mixing circuit, connected to the internal input matching circuit, for mixing the radio frequency and the local oscillator frequency signal which are impedance-matched; and an active balun circuit for outputting a first and a second frequency signals which are complementary by amplifying an intermediate frequency signal provided from the cascaded mixing circuit.

8. The multi-band and multi-mode frequency converting receiver as recited in claim 7, wherein the internal input matching circuit contains:

a first and a second transistors gate-coupled whose sources receive the radio frequency signal from the image eliminating filter means and the local oscillator frequency signal, respectively and gates are connected to the ground voltage terminal.

9. The multi-band and multi-mode frequency converting receiver as recited in claim 8, wherein the cascaded mixing circuit contains:

a third and a fourth transistors which are connected in series between the source voltage terminal and the ground voltage terminal, wherein the third transistor receives via its gate the drain output of the first transistor and the fourth transistor receives via its gate the drain output of the first transistor;

an inductor connected between the source voltage terminal and the source of the third transistor;

a first capacitor and a resistor which are connected in series between the source of the third transistor and the gate of the fourth transistor, thereby making a feedback structure; and a second capacitor, acting as a low pass filter, connected between the drain of the third transistor and the ground voltage terminal.

10. The multi-band and multi-mode frequency converting receiver as recited in claim 9, wherein the active balun circuit contains:

a fifth transistor whose gate receives the drain output of the third transistor and source is connected to the ground voltage terminal;

a sixth transistor whose gate is connected to the drain of the fifth transistor and source is coupled to the ground voltage terminal and which provides via its drain a signal whose phase is opposite to that of the signal outputted from the drain of the fifth transistor;

a seventh and an eighth transistors gate-coupled whose gates are commonly attached to the ground voltage terminal, wherein the seventh transistor is positioned between the drain of the sixth transistor and the first output terminal of the frequency mixing means outputting a second intermediate frequency signal and the eighth transistor is located between the drain of the fifth transistor and the second output terminal of the frequency mixing means outputting a first intermediate frequency signal; and a third capacitor, acting as a low pass filter, connected between the first and the second output terminals of the frequency mixing means.

11. The multi-band and multi-mode frequency converting receiver as recited in claim 10, wherein the intermediate frequency amplifying means contains:

a first differential amplifier circuit having a ninth transistor whose gate is coupled to the first output terminal of the frequency mixing means and a tenth transistor whose gate is combined with the second output terminal of the frequency mixing means;

a second differential amplifier circuit having an eleventh transistor whose gate is connected to the drain of the ninth transistor and a twelfth transistor whose gate is attached to the drain of the tenth transistor; and first and second inductors, acting as an output load, connected between the source voltage terminal and the drains of the eleventh and the twelfth transistors, respectively, wherein the eleventh and the twelfth transistors output via their drains final intermediate frequency signals, respectively, which are complementary.

* * * * *